April 19, 1927.
H. T. INGHRAM
1,625,365
STANDING GRAIN THRASHER
Filed Aug. 27, 1921
3 Sheets-Sheet 1
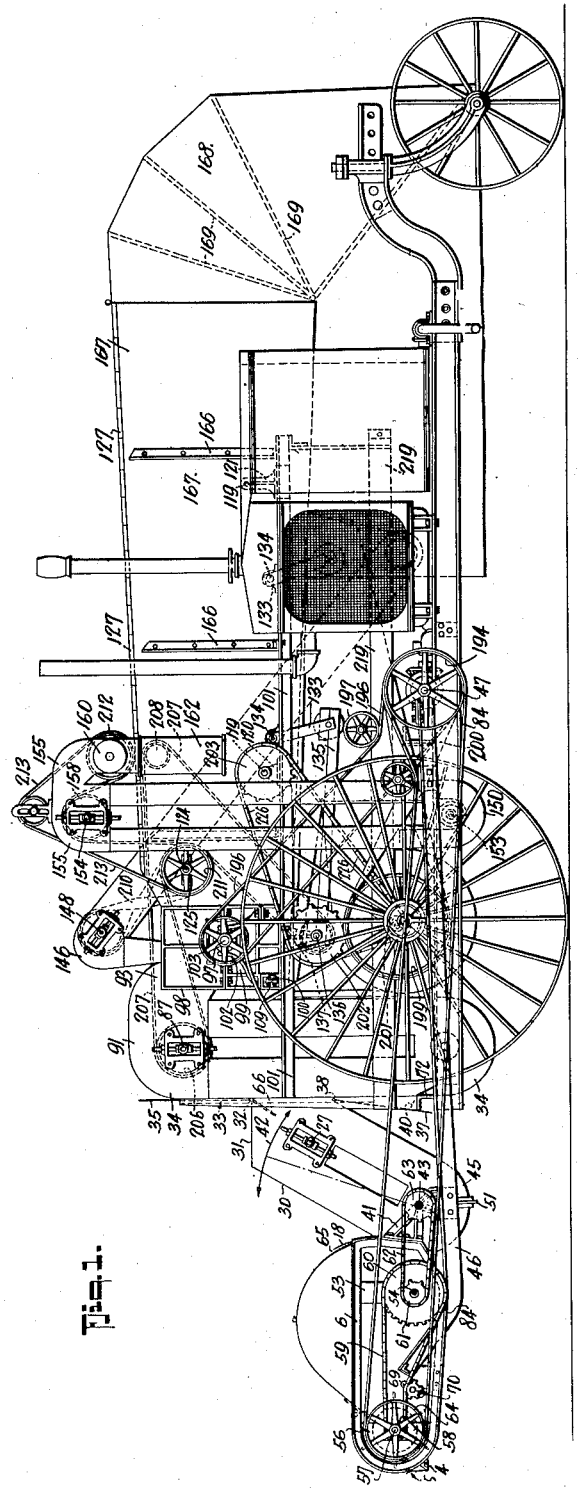
INVENTOR
Howard T. Inghram
BY
Fred G. Dieterich
ATTORNEYS

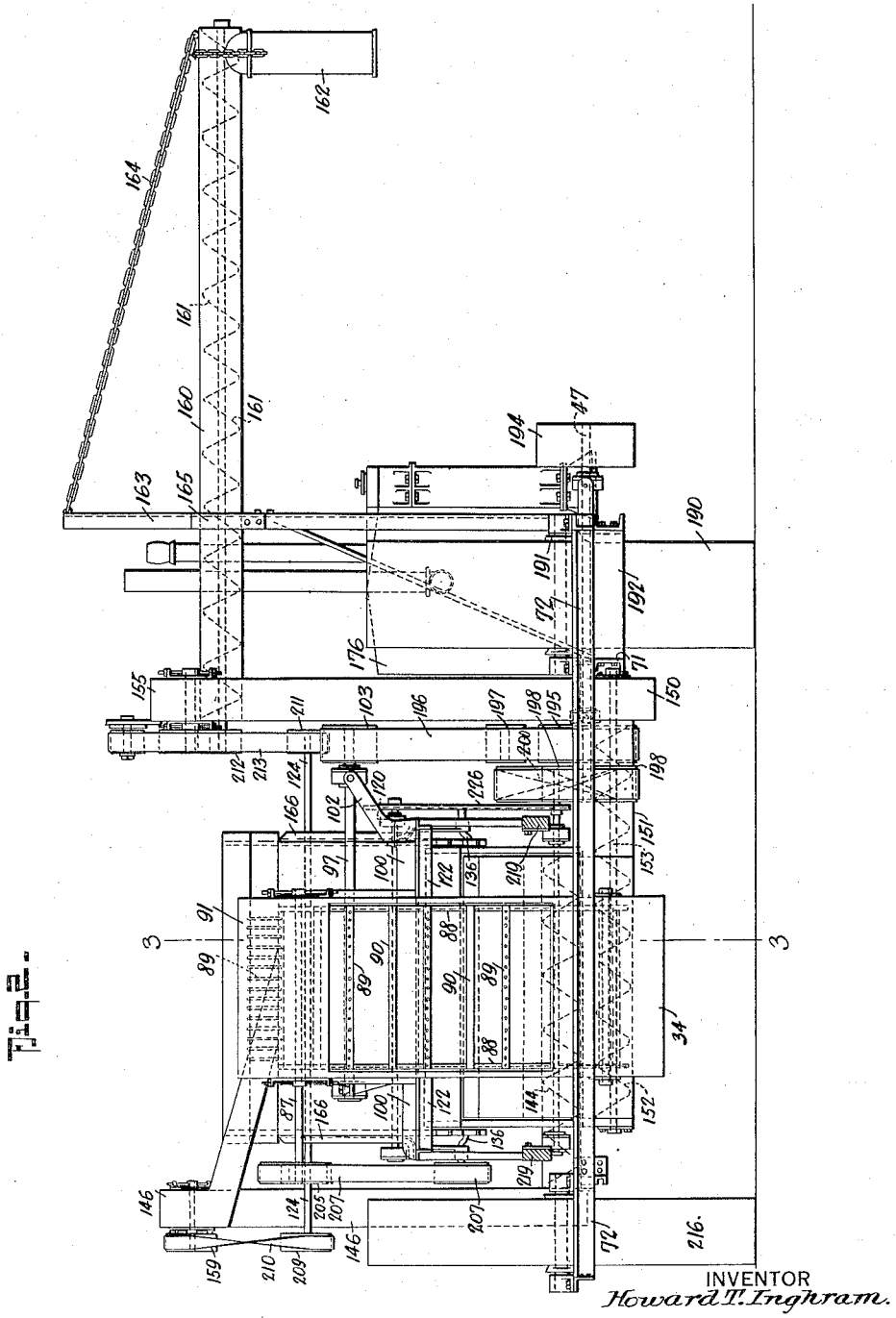

April 19, 1927.
H. T. INGHRAM
1,625,365
STANDING GRAIN THRASHER
Filed Aug. 27, 1921        3 Sheets-Sheet 3
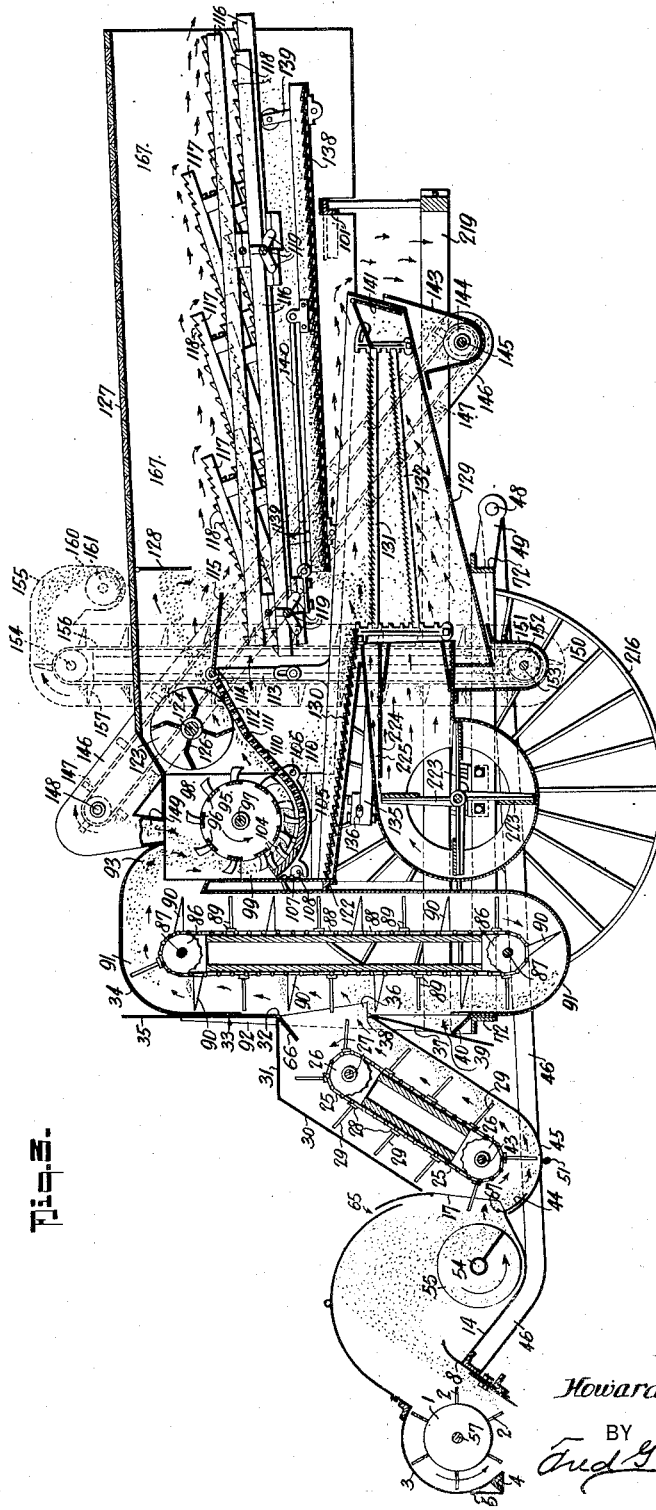
INVENTOR
Howard T. Inghram.
BY
ATTORNEYS Patented Apr. 19, 1927.

1,625,365

UNITED STATES PATENT OFFICE.

HOWARD T. INGHRAM, OF KANSAS CITY, MISSOURI, ASSIGNOR, BY DIRECT AND MESNE ASSIGNMENTS, OF ONE-FOURTH TO LOUIS KRAUS, HOWARD T. INGHRAM, AND GEORGE SCHAEFER, TRUSTEES OF THE TRUST DOING BUSINESS AS THE UNIVERSAL HARVESTER COMPANY, OF KANSAS CITY, MISSOURI, AND ONE-FOURTH TO UNIVERSAL HARVESTER CORPORATION, A CORPORATION OF COLORADO.

STANDING-GRAIN THRASHER.

Application filed August 27, 1921. Serial No. 495,890.

My invention relates to new and useful improvements in standing grain thrashers and the present invention has special relation to a grain thrashing and separating mechanism which is adapted for use in connection with the grain gathering mechanism such as that which forms the subject matter of my application filed Aug. 15, 1921, Serial No. 492,573.

Among the objects of the present invention is that of providing an efficient, simple and reliable means of thoroughly thrashing, separating, cleaning and delivering all kinds of small grain to the wagon or other receptacle, such as has been gathered by the grain gathering mechanism above referred to, as the harvester is being pushed or pulled over the standing grain in the field.

Another object of this invention is to provide an adequate yet simple separating means, thereby making possible the complete separation of all grain from the straw when excessive amounts of straw are being handled, such as for instance in stack thrashing when the machine is being used as a stationary thrasher.

In the drawings which illustrate a substantially complete and preferred embodiment of my invention—

Figure 1 is a left side elevation of the machine.

Figure 2 is a front elevation of the machine with the grain gathering mechanism omitted, parts being in section.

Figure 3 is a vertical longitudinal section of the machine on substantially the line 3—3 of Figure 2.

In the drawings in which like numerals of reference indicate like parts in all the figures, 1 is the body of the stripping or gathering cylinder which has teeth 2 and revolves at a high speed within the housing 3, the stripping cylinder housing being mounted on an angle bar 4 and is carried on the vertical adjustable arms 46. The stripping cylinder delivers into a gathering pan 14 in which is mounted a right and left screw conveyor 55 and having an intermediate throw-off portion to deliver the grain from the gathering pan.

To the rear of and near the center of the gathering pan is located an elevator, there being an opening in the gathering pan leading to the elevator. This elevator consists of two roller sprockets 26 which are mounted on suitable shafts 27 and 43, around which pass roller chains 25 that carry, at definite intervals, bars 28 containing rows of steel fingers 29. The front and top of the elevator housing consists of the surfaces 30 and 31, the front surface or sheet 30 having an opening at its lower end registering with the grain and straw discharge opening of the gathering pan, while the top surface 31 extends rearwardly to a rod 32, the ends of which project a suitable distance beyond the sides of the elevator and are adapted to be disposed to slide up and down in the longitudinal grooves 33 in either side of the main elevator 34 of the thrashing machine. Extending upwardly from the rod 32 and hinged thereto is a steel sheet 35 which is disposed to slide within the grooves 33 also. The sides of the primary elevator at the upper discharge end have extensions or wings 36 to extend on the inner sides of the main elevator 34, thereby maintaining in correct positions the two elevators. A sheet steel gate 37 is hinged at 38 and extends downwardly a distance sufficient so that the sheet will close the lower portion of the opening 39 in the front of the main elevator as the pan is raised and lowered while in operation, and the gate 35 serves the same purpose at the top. The gate 37 rests on the lip 40 of the opening 39. 66 is a deflector at the upper part of the discharge opening of the primary elevator.

As is clearly obvious when raising and lowering the gathering pan, such as is necessary for grain of various heights, the primary elevator being attached to the gathering pan at the bottom by suitable castings 41, provision is made for a slight movement of the elevator at the top, as indicated by the arrow 42, the radius center being at the center of the shaft 43. The rod 32 is always maintained in rectilinear position relative to the front of the main elevator.

Since the primary elevator is swingably mounted at the shaft 43, the gathering pan is provided with a sheet extension 44 (from the edge 67) conforming to the shape of the lower elevator section 45 and extending on the inside thereof, thus avoiding loss of grain at this point.

As a support for the primary elevator, a truss rod 51 is provided which extends beneath the elevator, the ends of the truss rod being held in a rectilinear position relative to the center of the elevator shaft 43, thus making possible the slight movement of the elevator necessary when raising and lowering the gathering pan.

Referring especially to Figure 1, it will be seen that within the frames 6 are carried suitable bearings 53 for the shaft 54 of the spiral conveyor 55 and bearings 56 for the stripping cylinder shaft 57.

On the shaft 57 is a roller sprocket 58 driving the roller chain 59 which, in turn, operates the sprocket 60, thus driving the spiral conveyor 55. Adjacent to the sprocket 60 is located a smaller steel sprocket 61 serving as a driving means for the elevator. The stripping cylinder is driven by the pulley 64. The shaft 43 is driven through sprocket 63 from sprocket 61 by a chain 62.

From the primary elevator, which forms a part of the gathering mechanism, the grain and straw is delivered into the main elevator 34 (see Fig. 6) of the thrashing machine. This elevator consists of a stationary housing 91 in which are mounted the shafts 87 that carry roller sprockets 86 for the roller chains 88. The chains 88 have steel finger bars 89 and they also have sheet metal buckets 90, as best indicated in Figure 3 of the drawings.

The housing 91 has a vertical elongated opening to receive the material from the primary elevator and it is also provided with side extensions or wings 92 adjacent to said opening to cooperate with the wings 36 of the primary elevator to maintain the elevators in proper relative position.

The main elevator 34 has a discharge throat 93 at its top. The upper shaft 87 of the elevator has adjustable take-up bearings 94.

The purpose of the steel fingers 89 is to carry upward the straw as delivered by the primary elevator to the main elevator, the buckets carrying the loose grain as indicated by the dots in Figure 3, thus preventing a congestion of grain in the bottom of the elevator 34. As the mass is thrown into the elevator 34, the straw is again torn to pieces by coming in contact with the series of fingers of that elevator, thus further preventing straw etc. from entering the thrashing cylinder 95 in bunches, which is detrimental.

The thrashing cylinder is composed of steel heads which carry toothed bars 96, the whole being securely mounted on the shaft 97.

The cylinder housing is composed of two sections for either side, upper sections 98 and lower sections 99. The lower sections 99 are provided with outwardly extending lugs 100 disposed to be attached to the top frame 101. As will be noticed, the lower section 99 of the cylinder housing of the belt side is designed in such manner as to support the roller bearing bracket 102, thus rigidly keeping the roller bearing at a point near the drive pulley 103. The opposite roller bearing is supported by the lower section 99 of the cylinder housing in a manner close thereto.

The bars carrying the concaved teeth 104 are supported in the concaved rests 105 which are hinged at 106 at one end and engage the eccentric 107 at the other end, thus making possible a limited adjustment of the concaves by means of the eccentric 107 which is supported by the shaft 108. The shaft 108 is operated from the outside by means of a hand wheel 109 with means for maintaining the adjustment of the concaves. Adjacent to the concave bars will be noticed a series of fixed grate work 110 which is composed of slats rigidly held a definite distance apart, thus extending in a straight direction to the hinge 111 and from this point the course of the grate changes slightly terminating at 114. At this place a bar extending crosswise the machine and containing a row of steel fingers 115 is swingably mounted and through the medium of the downwardly extending articulated casting 113, which, in turn, is connected to a part of the shoe 129, the fingers 115 are made to vibrate by the oscillation of the shoe.

The orbital straw racks 116 being provided with upwardly extending sections 117 at definite intervals, the whole thereof being provided with a series of grate work 118, are attached to revolving crank shafts 119 which are in turn supported by suitable bearings 120 and 121 that are attached to the top frame 101.

As will be noticed, the crank shafts have centers of one hundred and twenty degrees, so designed that power applied to the first shaft will be transmitted through the racks to the second crank shaft without further power adjustments thereto. It should be clearly undersood that the orbital motion of the straw rack sections is essential to a positive and fast movement of the straw through the separator.

Referring again to Figure 3, it will be noticed that the changed course of that portion 112 of the grate work makes possible the arrangement of the beater or distributor 123 in such manner that the lower portion thereof is somewhat lower than the top of the grate 110, thus better insuring that all grain and straw from the cylinder will be stopped at this point and by the beater will be dragged over the remainder of the grate, thereby greatly aiding in a more thorough separation of the grain from the straw. The beater or distributor 123 is provided with two heads which are mounted on the shaft 124 that extends through either side of the top 127, suitable bearings 125 for the same being provided. Between the two heads are supported four V-shaped blades 126, as shown, the direction of travel being indicated by the adjacent arrow.

128 is a baffle plate to the rear and somewhat above the fingers 115.

The shoe 129 containing the grain pan 130, the chafer 131 and the sieve 132 is maintained in position by means of four downwardly extending arms 133, two being attached to either side, the tops of said arms being swingably mounted at 134 to the top frame. The oscillation of the shoe is brought about by two arms or pitmen 135 which are attached at one end to either side of the shoe, the opposite ends thereof being attached to and operated by a suitable crank shaft 136, supported in bearings 137 and which are, in turn, supported by the top frame 101.

The grain pan 138 is situated beneath the sectional straw racks 116 and is supported in a manner similar to the shoe 129 by means of two pivoted hanger bars 139 and is made to oscillate by means of two pitmen 140 attached at either end to the side of the grain pan and to the revolving crank shaft 119.

141 is a baffle board at the rear of the shoe for dragging the tailings into the tailing spout 143 which is sustained on end castings 142. The tailing spout 143 is composed of two end castings 142, one of which is attached to the lower frame bars 219, the other being a part of the lower section of the return elevator.

Securely fastened to these head members is the sheet steel wall or hopper portion of the spout 143 which extends up to the shoe on both sides in such manner that all heads, grain, etc., will be deposited therein, which, in turn, are conveyed to the return elevator 146 by the spiral conveyor 144 on the shaft 145. The return elevator consists of the elevator housing 146 in which the belt pulleys, over which the conveyor belt and blocks 147 pass, are located on the shaft 145 of the conveyor and on the drive shaft 148.

149 is the spout which delivers the material back into the thrashing cylinder housing 98. The blocks 147 which are attached at definite intervals along the belt serve to drag the mass to the top where it is returned to the thrashing cylinder as just stated.

To the rear of the shoe 129 is located the grain spout 151 which is attached at one end to the lower frame, the other end being attached to the elevator bottom 150, as shown. Operating therein is the spiral conveyor 152 which delivers the grain to the grain elevator. The grain elevator, as will be noticed, is composed of the main housing 155 and located at either end within the same are shafts 154 and 153 around which passes a belt 156, to which is attached at definite intervals steel buckets 157, discharging their contents in that compartment wherein is located the spiral conveyor 161 which, in turn, conveys the grain to the end of the cylindrical housing 160 and from there it falls through a swinging pipe 162 into the wagon or other receptacle.

158 is a drive pulley on the shaft 154 and 159 is a drive pulley on the shaft 148.

The cylindrical part of the transverse conveyor housing 160 containing the spiral conveyor 161 is maintained in position by means of upwardly extending supporting angles 163 which are attached at the lower end to the main frame. The outer end of the conveyor housing 160 is supported by means of the chain 164, the opposite end resting within a yoke 165 which is a part of the supporting angle of standard 163.

The top units 167 and 127 are attached to the upper frame section 101 by means of formed angles 166 arranged at intervals on either side, and to the rear of said top is attached a canvas hood 168 which is supported by the framework 169, the purpose of which is to cause all dust, chaff, straw, etc. emanating from the separator to be deposited within the standing straw, thus preventing this material from being blown around the motor, operator, etc., by the wind.

The cleaning of the grain is accomplished by means of the overshot cleaning fan 223. At 224 will be noticed an adjustable door controlling the entrance to the air duct 225, the purpose of which is to deliver a proper quantity of air through the stream of grain, chaff, etc., as it comes from both grain pans 130 and 138 at a point just above the chafer 131, thus blowing to the rear a very large percentage of the chaff from the grain before it falls onto the chafer, thereby relieving the chafer from this additional amount of chaff, thus insuring more efficient cleaning and greatly increasing the capacity of the shoe. After passing over the chafer, the unthrashed heads are deposited in the tailing spout hereinbefore referred to.

The grain which has been thoroughly thrashed and cleaned passes through the sieve 132 to the bottom 150 of the shoe 129 and by the oscillating motion thereof is moved to the grain spout 151 wherein is located the spiral conveyor 152 hereinbefore referred to, which, in turn, delivers the cleaned grain to the grain elevator from whence it is taken to the wagon or other receptacle as before described.

Referring now more particularly to Figure 1, it will be noticed that the grain gathering mechanism is driven by the wide belt 84 directly from the drive shaft and pulley 194, there being adequate means for tightening said belt as before described. On the inside of the power unit and mounted on the shaft 47 is located a drive pulley 195 disposed to operate the thrashing cylinder by means of the belt 196, there being a suitable belt tightener 197 provided.

Near the pulley 195 and on the same shaft is located another pulley 198 disposed to drive the cleaner fan pulley 199 by means of the twisted belt 200. On the cleaner fan shaft is mounted a small steel sprocket 201 adapted to operate the shoe shaker shaft sprocket 202 and the rotary straw rock shaft sprocket 203 by means of the steel roller chain 226, as indicated.

On the opposite end of the shoe crank shaft is attached a pulley which drives the beater or distributor pulley 205 and the main elevator pulley 206 by means of the belt 207, there being a belt tightening means 208 provided for the usual purpose.

At the end of the beater shaft is located another pulley 209 driving the return elevator pulley by the twisted belt 210. The pulley 211 mounted on the opposite end of the beater shaft drives the grain elevator pulley and the spiral conveyor pulley 212 by means of the belt 213, the bracket and pulley 214 serving as a tightening means.

In operation the grain gathering mechanism gathers the grain which assumes a course indicated by the dots in Figure 3, entering the grain pan and passing into the primary elevator from whence the material is conducted into the main elevator and delivered to the thrashing cylinder housing, passing therefrom and being thrashed in the manner heretofore described.

From the foregoing description taken in connection with the accompanying drawings, it is thought the complete construction, operation and advantages of the invention will be clear to those skilled in the art to which it appertains.

While I have shown and described in this application the grain gathering mechanism, yet I wish it understood that such mechanism per se forms no part of the present application but constitutes the subject matter of my application filed on the 15th day of August, 1921, Serial No. 492,573 hereinbefore referred to.

While I have shown and described a preferred embodiment of my invention in this application, I wish it understood that I do not limit myself to the details of construction herein shown and described as numerous changes in the details of construction, combination and arrangements of parts may be made without departing from the spirit of the invention or the scope of the appended claims.

What I claim is:

1. In a thrashing machine wherein is provided straw racks and grain pans; a thrashing cylinder, a concave associated therewith and located below the cylinder, an articulated flat grate extending upwardly and rearwardly from the concave, fingers extending downwardly and rearwardly from the upper end of the grate, a rotary beater associated with the grate at a place between the upper end of the grate and the lower end thereof, said grate adapted to permit passage of the grain therethrough onto a grain pan beneath, and said fingers adapted to deliver the straw onto the straw racks, and means for shaking said fingers and the adjacent portion of said flat grate substantially as shown and described.

2. In a thrashing machine wherein is provided straw racks and grain pans; a thrashing cylinder, a concave associated therewith and located below the cylinder, an articulated flat grate extending upwardly and rearwardly from the concave and composed of two flat sections inclined one with respect to the other, one of said sections being rigidly held and the other being movable with relation to the first section, fingers extending downwardly and rearwardly from the upper end of the grate, a rotary beater associated with the grate at a place between the upper end of the grate and the lower end thereof, said grate adapted to permit passage of the grain therethrough onto a grain pan beneath, and said fingers adapted to deliver the straw onto the straw racks and means for shaking said fingers and the adjacent portion of said grate, substantially as shown and described.

3. In a thrashing machine wherein is provided a rotary thrashing cylinder, a primary elevator into which the grain and straw is delivered, said elevator comprising an upright housing containing an endless conveyor, said housing having a delivery outlet to discharge the grain and straw onto the thrashing cylinder, said housing having an inlet opening intermediate the upper and lower ends thereof, said conveyor comprising an endless chain structure carrying straw receiving fingers alternating with loose-grain carrying buckets, and means to deliver the gathered straw and grain to the inlet of said elevator, all being arranged whereby the elevator fingers will carry up the straw and the buckets will carry up the loose grain which falls from the straw, thereby avoiding congestion of grain in the bottom of the elevator housing as well as effecting a primary separation of straw and grain.

4. In standing grain thrashers, a thrashing cylinder and housing therefor, a concave with teeth beneath said thrashing cylinder, a gratework consisting of two flat areas inclined one with respect to the other and hinged together and extending upwardly from said concave to the rear of said thrashing cylinder, the section of the grate work adjacent the thrashing cylinder being fixed and the other section being movable, a series of fingers projecting at the upper end of said gratework and rearwardly inclined, means for moving said fingers and the adjacent section of gratework to impart reciprocation thereto, and a rotary beater located adjacent to and cooperating with the movable section of said gratework, substantially as shown and described.

HOWARD T. INGHRAM.